United States Patent

Suzuki et al.

[11] Patent Number: 5,488,670
[45] Date of Patent: Jan. 30, 1996

[54] COLOR IMAGE PROCESSING METHOD AND APPARATUS

[75] Inventors: Yoshiyuki Suzuki, Kawasaki; Masahiro Funada, Yokohama, both of Japan

[73] Assignee: Canon Kabushiki Kaisha, Tokyo, Japan

[21] Appl. No.: 165,580

[22] Filed: Dec. 13, 1993

Related U.S. Application Data

[63] Continuation of Ser. No. 877,390, Apr. 30, 1992, abandoned, which is a continuation of Ser. No. 327,002, Mar. 22, 1989, abandoned.

[30] Foreign Application Priority Data

Mar. 25, 1988 [JP] Japan ..................... 63-72969

[51] Int. Cl.$^6$ ..................... G06K 9/00
[52] U.S. Cl. ................. 382/165; 348/703; 358/520; 382/199
[58] Field of Search .................. 382/17, 56, 22, 382/16; 358/31, 324, 334, 500, 520; 348/663, 649, 703

[56] References Cited

U.S. PATENT DOCUMENTS

| | | | |
|---|---|---|---|
| 4,189,711 | 2/1980 | Frank | 382/22 |
| 4,538,182 | 8/1985 | Saito et al. | 382/17 |
| 4,642,682 | 2/1987 | Orsburn et al. | 358/80 |
| 4,673,977 | 6/1987 | Stelzenmuller | 382/56 |
| 4,700,399 | 10/1987 | Yoshida | 382/17 |
| 4,718,089 | 1/1988 | Hayashi et al. | 382/17 |
| 4,797,945 | 1/1989 | Suzuki et al. | 382/56 |
| 4,852,183 | 7/1989 | Abe et al. | 382/34 |
| 4,856,074 | 8/1989 | Nagaoka | 382/22 |
| 4,887,151 | 12/1989 | Wataya | 358/80 |
| 4,896,364 | 1/1990 | Lohscheller | 382/22 |
| 4,910,786 | 3/1990 | Eichel | 382/22 |
| 4,974,071 | 11/1990 | Maeda | 358/80 |
| 4,991,223 | 2/1991 | Bradley | 358/22 |
| 5,089,884 | 2/1992 | Suzuki et al. | 358/80 |

Primary Examiner—Joseph Mancuso
Attorney, Agent, or Firm—Fitzpatrick, Cella, Harper & Scinto

[57] ABSTRACT

A color image processing apparatus is disclosed in which a color image signal is separated into lightness data and chromaticity data, and if it is decided that a block includes an edge and the lightness data and chromaticity data of the block have a strong correlation, the block is identified as one including an edge of a color line image.

20 Claims, 6 Drawing Sheets

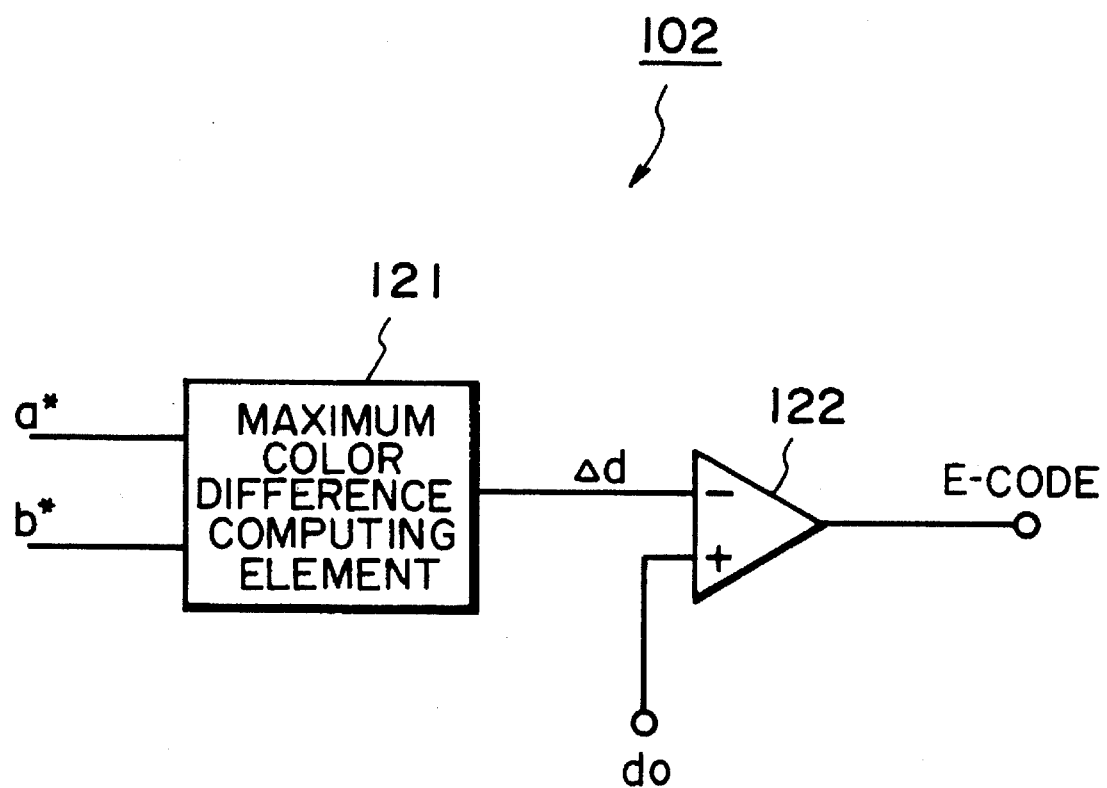
F I G. 7

COLOR IMAGE PROCESSING METHOD AND APPARATUS

This application is a continuation of application Ser. No. 07/877,390 filed Apr. 30, 1992, now abandoned, which was a continuation of application Ser. No. 07/327,002 filed Mar. 22, 1989, now abandoned.

BACKGROUND OF THE INVENTION

1. Field of the Invention

The present invention relates to a color image processing apparatus.

2. Description of the Related Art

Many conventional image processing techniques pay attention to a portion including a high spatial frequency component (i.e., an edge portion). For example, a typical processing technique is an edge emphasis technique for increasing sharpness of an image to improve image quality. On the other hand, in the field of an image compression technique, the way of processing the edge portion has a large influence on compression efficiency. More specifically, an image including an edge portion (high frequency component) has a large data volume. For example, when a lossless data storage type compression technique, such as a predictive coding technique or the like, is used, coding efficiency is impaired, and the overall compression ratio is decreased. On the other hand, when a lossy data non-storage compression technique such as a vector quantization technique or orthogonal transformation technique is employed, degradation of edge portions is considerable. In proportion an image includes more edge portions, quality of the reproduced image is degraded.

Therefore, a large number of adaptive type compression techniques have been proposed wherein image nature (edge portion versus flat portion) is determined for every specific area such as a block constituted by a plurality of pixels or a pixel of interest and its surrounding pixel group in an image, and a technique suitable for the determined type of image is employed for that block or pixel.

Edge portions which seem to be the same microscopically may often have different image tones macroscopically. In this case, if identical processing is performed for these portions, it may often be unsuccessful. More specifically, when edge emphasis is adopted as the processing, processing is preferably different for a line image such as a character image and for a halftone image such as a photograph. For example, in the case of edge emphasis, processing is preferably selectively performed in such a manner that relatively strong emphasis is performed for a line image, and relatively weak emphasis is performed (or no processing at all is made) for a halftone image.

When color image compression is adopted as the processing, in an adaptive compression/expansion technique depending on the presence/absence of an edge, data can be efficiently compressed in a color character image portion without image degradation. However, if such compression is performed for an edge substantially the same as a color character portion in the remaining color image, considerable image degradation occurs.

SUMMARY OF THE INVENTION

It is an object of the present invention to provide a color image processing method or apparatus which can accurately decide a feature of a color image in consideration of the above situation.

It is another object of the present invention to provide a color image processing method or apparatus which can satisfactorily identify color line image portions in a color image.

It is still another object of the present invention to provide a color image processing apparatus which can suppress image degradation as much as possible when a plurality of pixels are processed as one block.

In order to achieve the above objects, according to a preferred embodiment of the present invention, there is provided a color image processing apparatus wherein a color image signal is separated into lightness data and chromaticity data, and if it is decided that a block includes an edge and the lightness data and chromaticity data of the block have a correlation, the block is determined to be one including an edge of a color line image.

It is still another object of the present invention to provide a color line image decision method suitable for processing such as edge emphasis, color conversion, and the like.

It is still another object of the present invention to provide a color line image decision method suitable for color image compression processing.

It is still another object of the present invention to provide a novel color image compression method.

The above and other objects and features of the present invention will be apparent from the following description of preferred embodiments taken in conjunction with the accompanying drawings.

BRIEF DESCRIPTION OF THE DRAWINGS

FIGS. 6 and 7 are block diagrams showing a color image signal compression system to which a decision method of the present invention is applied.

DETAILED DESCRIPTION OF THE PREFERRED EMBODIMENTS

The principle of the present invention will be described below.

The background color of most color character images and the like is white, and these images are printed on a white paper sheet like a general document image. 10 When a color character image is observed in units of small blocks including a color edge, it can be considered that these blocks are constituted by character color components and white background color components. Therefore, it can be considered that a color of a pixel block including an edge portion of a color character image is constituted by two colors, i.e., a chromatic color as a character color and an achromatic color or value as background color.

FIGS. 3A to 3F are views showing a case wherein pixels in each block are converted to an L*a*b* uniform color space, and are projected onto a chromaticity plane (a*,b*).

In FIGS. 3A to 3F, a mark "x" corresponds to the chromaticity of one pixel.

Figure 3A:
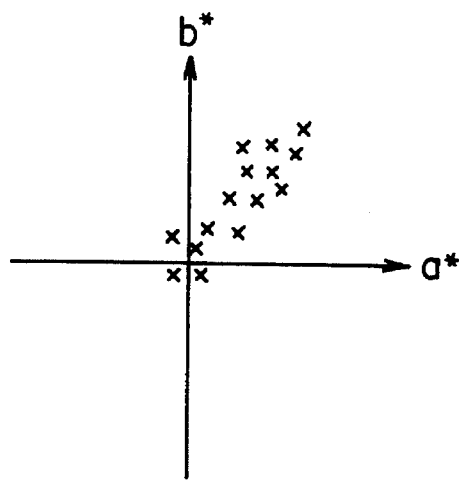
FIGS. 3A to 3F are views for explaining the embodiments.

FIG. 3A shows a block including an edge portion of a color image. Pixels are distributed from an origin (a*,b*)= (0,0) in one hue direction. As is apparent from FIG. 3A, this block is constituted by one chromatic color and an achromatic color. In this case, lightness and chromaticity have a correlation. More specifically, a color character edge is constituted by white components and character color components, and pixels are present on or near a line connecting a white component (which is an achromatic color component and has high lightness) and a character color component having some given lightness and chromaticity. When such a pixel group is projected onto the chromaticity plane, FIG. 3A (or a similar figure) is obtained. In this case, it can be considered that the lightness and chromaticity have a correlation.

Figure 3B:
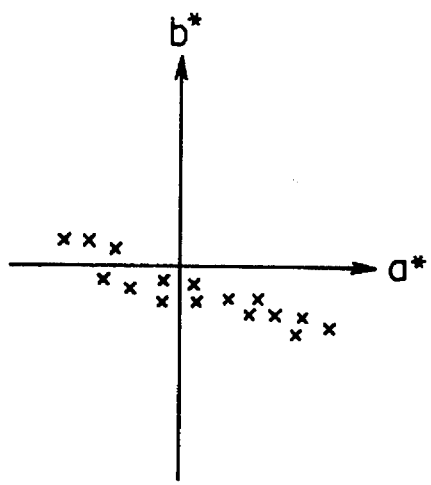
Figure 3C:
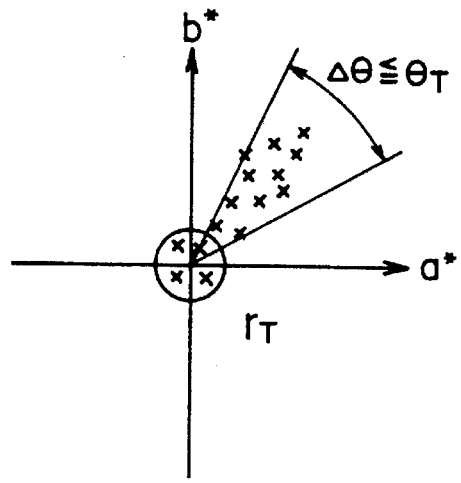
Figure 3D:
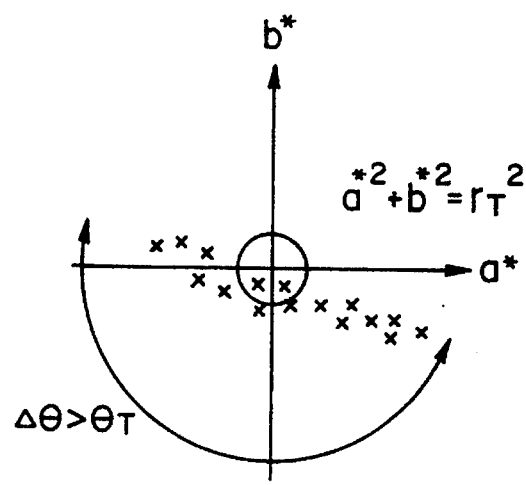

FIG. 3B shows a block constituted by two chromatic colors. A correlation with lightness is guaranteed in this case.

As described above, from among image blocks including a color edge, blocks having correlation between lightness and chromaticity can be identified as those which constitute an edge portion of a color character. As a criterion for deciding that the lightness and chromaticity have a correlation, it is effective to decide whether or not a block image is constituted by one chromatic color and an achromatic color.

As described above, a color edge constituting a color character is separated from other color edge portions, and processing suitable for this color edge is performed, thereby obtaining a satisfactory image processing result. This effect is particularly noticeable when the manner of processing of an edge of a color character such as edge emphasis, image compression, or the like has a large influence on image quality or compression efficiency.

Figure 1:
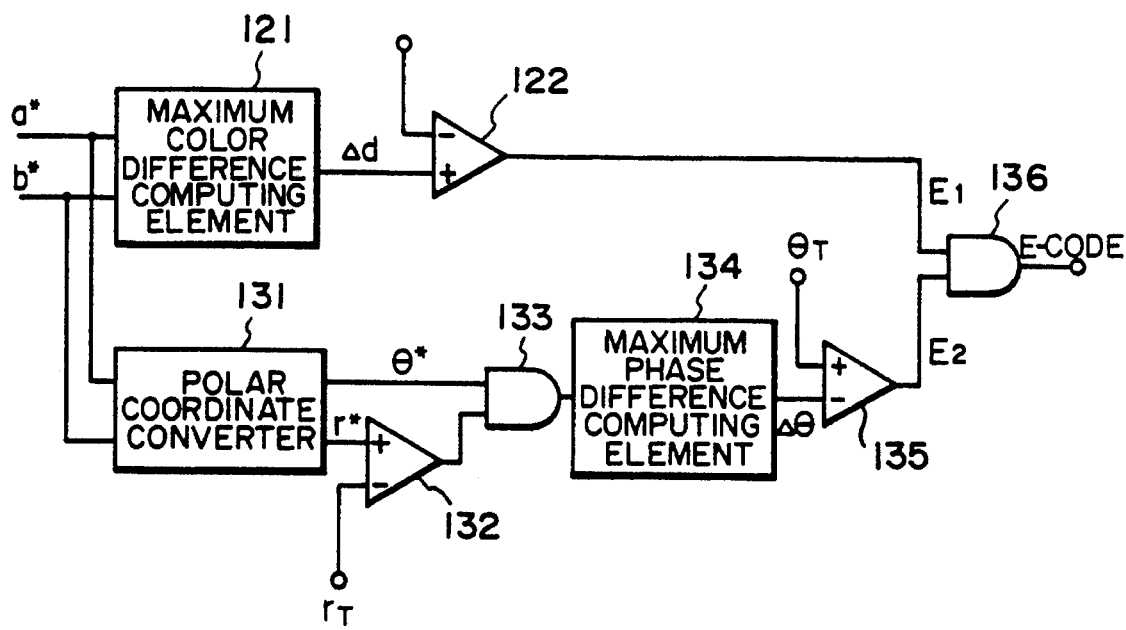
FIG. 1 is a block diagram showing a first embodiment of the present invention.

FIG. 1 is a block diagram showing an embodiment of the present invention.

This circuit extracts only a block constituted by a chromatic color and an achromatic color from blocks 10 which are decided as color edge blocks.

This circuit has a maximum color difference computing element 121, a comparator 122, a polar coordinate converter 131, a comparator 132, AND gates 133 and 136, a maximum phase difference computing element 134, and a comparator 135.

The maximum color difference computing element 121 computes color differences between respective pairs of pixels constituting the block and outputs a maximum value $\Delta d$. More specifically, a maximum value of color differences between corresponding pixels, e.g., $(a_{n1,m1}-a_{n2,m2})^2 +(b_{n1,m1}-b_{n2,m2})^2$ is selected that (n1,m1) and (n2,m2) represent the positions of pixels in a block. (Such a color difference may alternatively be calculated as another function, e.g., $|a_{n1,m1}-a_{n2,m2}|+|b_{n1,m1}-b_{n2,m2}|$.)

The output $\Delta d$ of the maximum color difference computing element 121 is compared with a threshold value $d_0$ by the comparator 122. The output from the comparator 122 indicates whether or not a color edge is present in a processing block.

The maximum phase difference computing element 134 computes differences between hues or color phases of pixels input through the gate 133 of color phases $\theta^*$ of the pixels constituting the block, and outputs a maximum value $\Delta\theta$. More specifically, a maximum value of color phase differences between corresponding pixels, e.g., $\theta|_{n1,m1}-\theta_{n2,m2}|$ is selected.

The output from the maximum phase difference computing element 134 is compared with a threshold value $\theta_T$ by the comparator 135. The output from the comparator 135 indicates whether one or more color phases are present in a processing block.

The operation of this embodiment will be described below.

When the maximum color difference $\Delta d$ in a block is larger than the threshold value $d_0$, it is decided that the block is a color edge block. The comparator 122 outputs a signal of level "1". The polar coordinate converter 131 converts chromaticity signals (a*,b*) into amounts ($\theta^*,r^*$) corresponding to a color phase and saturation. The comparator 132 compares a threshold value $r_T$ and $r^*$ so as to remove points near the origin, and its output signal is used as a gate signal for the AND gate 133, so as to allow a color phase signal $\theta^*$ of a pixel having $r^*$ larger than $r_T$ to pass through the AND gate 133. Thus, accuracy of the determination whether one or more color phases are present in a block can be improved.

The maximum phase difference computing element 134 computes color phase differences $\theta$ of pixels having $r^*$ larger than $r_T$, and outputs the maximum value $\Delta\theta$ of the differences (the maximum phase difference computing element 134 may be constituted by a subtractor, a comparator, a selector, and the like).

A color phase difference must be corrected to fall within the range of 0 to $\pi$. More specifically, as a color difference between two pixels, $\frac{2}{3}\pi$ and $\frac{4}{3}\pi$ (for example) have the same meaning. In this case, both values are processed as $\frac{2}{3}\pi$ to facilitate the arithmetic in the maximum value detection. The maximum color phase difference $\Delta\theta$ computed as described above is compared with the threshold value $\theta_T$ by the comparator 135. When $\theta_T$ is larger than $\Delta\theta$, it is decided that one color phase is present in the block, and the comparator 135 outputs a signal of level "1". The signal of level "1" is ANDed with a color edge decision signal E1 by the AND gate 136, thereby obtaining a final decision signal Ecode. The decision signal Ecode goes to level "1" when a block includes a color edge and only one color phase is present in the block, i.e., the block is constituted by a chromatic color and an achromatic color and has an edge. In this embodiment, paying attention to a color phase on an a*b* plane, when the maximum value $\Delta\theta$ of the color phase differences $\theta$ between correspondence pixels in one block is smaller than a given threshold value $\theta_T$ (a case shown in FIG. 3C), it is decided that a block includes one color phase. Since pixels around the origin become error factors, only pixels having $(a^*)^2+(b^*)^2$ larger than $r_T^2$ are used as objects to be decided.

In the above embodiment, the AND gate 136 may be omitted, and the decision signal Ecode may be a 2-bit signal, so that when (E1,E2)=(1,1) and (1,0), a block having a color character edge and a block having another color edge are identified, respectively. When E1 is "0", a flat block may be decided.

Figure 2:
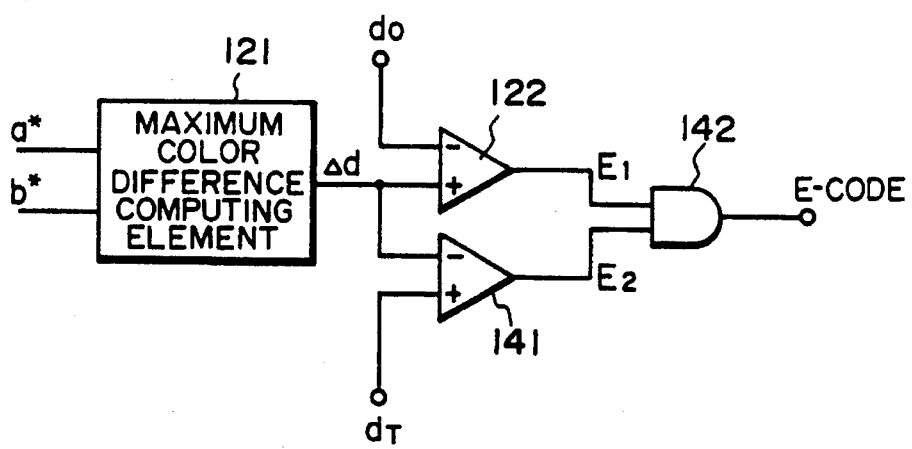
FIG. 2 is a block diagram showing a second embodiment of the present invention.

FIG. 2 is a block diagram showing a second embodiment of the present invention.

In the embodiment shown in FIG. 2, it is detected that an image in a block is constituted by a chromatic color and an achromatic color so as to decide a color character edge as in the embodiment shown in FIG. 1.

In this embodiment, the circuit has a maximum color difference computing element 121, comparators 122 and 141, and an AND gate 142.

Figure 3E:
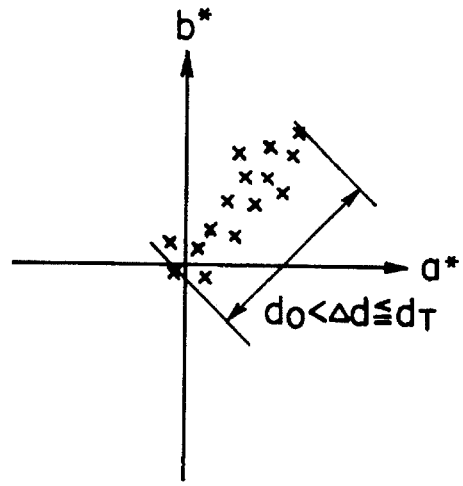
Figure 3F:
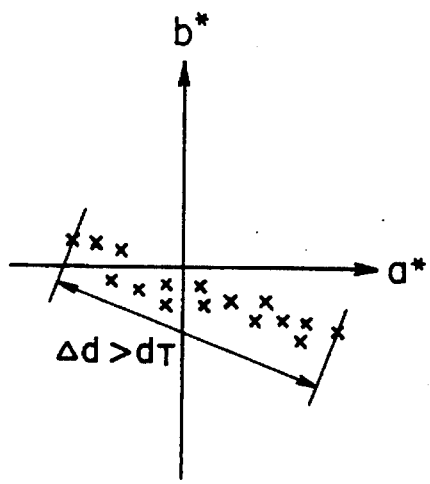

The principle of this embodiment will be described below with reference to FIGS. 3E and 3F.

Paying attention to a maximum color difference in a block, when the block is constituted by a chromatic color and an achromatic color, one of the two pixels giving the maximum color difference corresponds to the chromatic color and is present near the origin. Therefore, in this case, a color difference between any two pixels in the block does not exceed a given value. When a block is constituted by two chromatic colors, the color difference may assume a large value. In this manner, when a block includes a color edge portion whose maximum color difference $\Delta d$ is larger than $d_0$ and $d_T$ ($d_T$ being another threshold value for the maximum color difference) is equal to or larger than $\Delta d$, the block is identified as a color character edge block. Contrary to this, if $d_T$ is smaller than $\Delta d$, the block can be decided as a color edge block.

In FIG. 2, the maximum color difference computing element 121 calculates the maximum color difference $\Delta d$. The comparator 122 compares the maximum color difference $\Delta d$ with the threshold value $d_0$, thus obtaining a color edge decision signal E1. The comparator 141 compares the maximum color difference $\Delta d$ with another threshold value $d_T$ to obtain a signal E2 as a comparison result. The AND gate 142 ANDs the signal E2 and the color edge decision signal E1. If the output of the AND gate 142 goes to level "1", it can be decided that the block includes not merely a color edge but a color character edge constituted by a chromatic color and an achromatic color. In this case, the AND gate 142 may be omitted, and a 2-bit signal constituted by E1 and E2 may be used as the decision signal Ecode.

The circuit arrangement of the embodiment shown in FIG. 2 is simplified as compared to the embodiment shown in FIG. 1. In other words, the maximum color difference computing element 121 used in a conventional apparatus can be commonly used, and a hardware arrangement can be easily realized. However, possibility of a decision error is slightly larger than that in the embodiment shown in FIG. 1. However, if this embodiment is applied to a compressor or expander, the influence is not so large.

Figure 4:
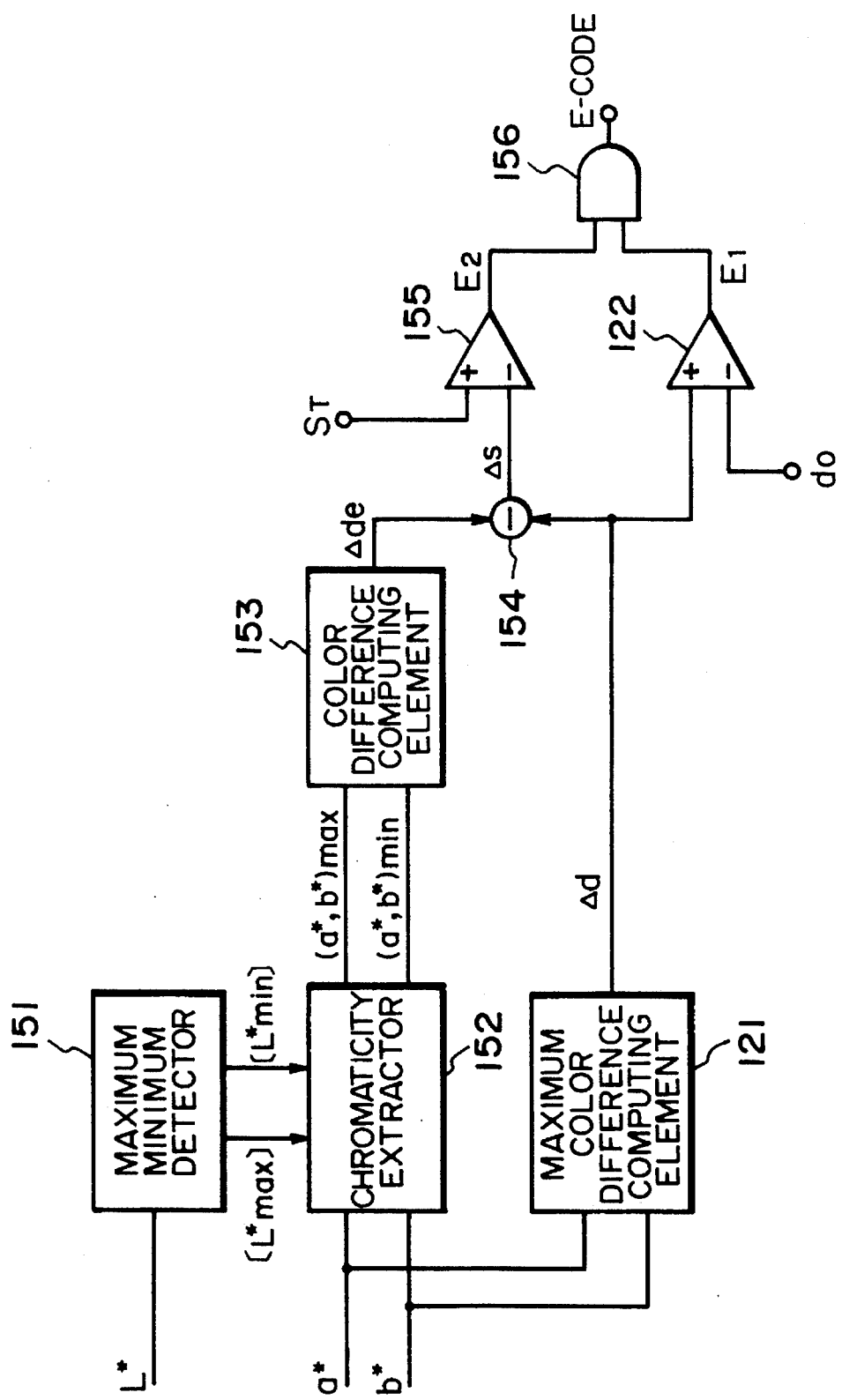
FIG. 4 is a block diagram showing a third embodiment of the present invention.

FIG. 4 is a block diagram showing a third embodiment of the present invention.

In this embodiment a color character edge is extracted by directly checking a correlation between lightness L* and chromaticity (a*,b*).

More specifically, if the absolute value of the difference ($\Delta d - \Delta de$) between a maximum value $\Delta d$ of color differences between pixels in a block and the color difference $\Delta de$ between the pixels corresponding to the maximum and minimum values of the lightness L* of the pixels in the block is small, it can be decided that the correlation between the lightness and the chromaticity is strong.

Figure 5:
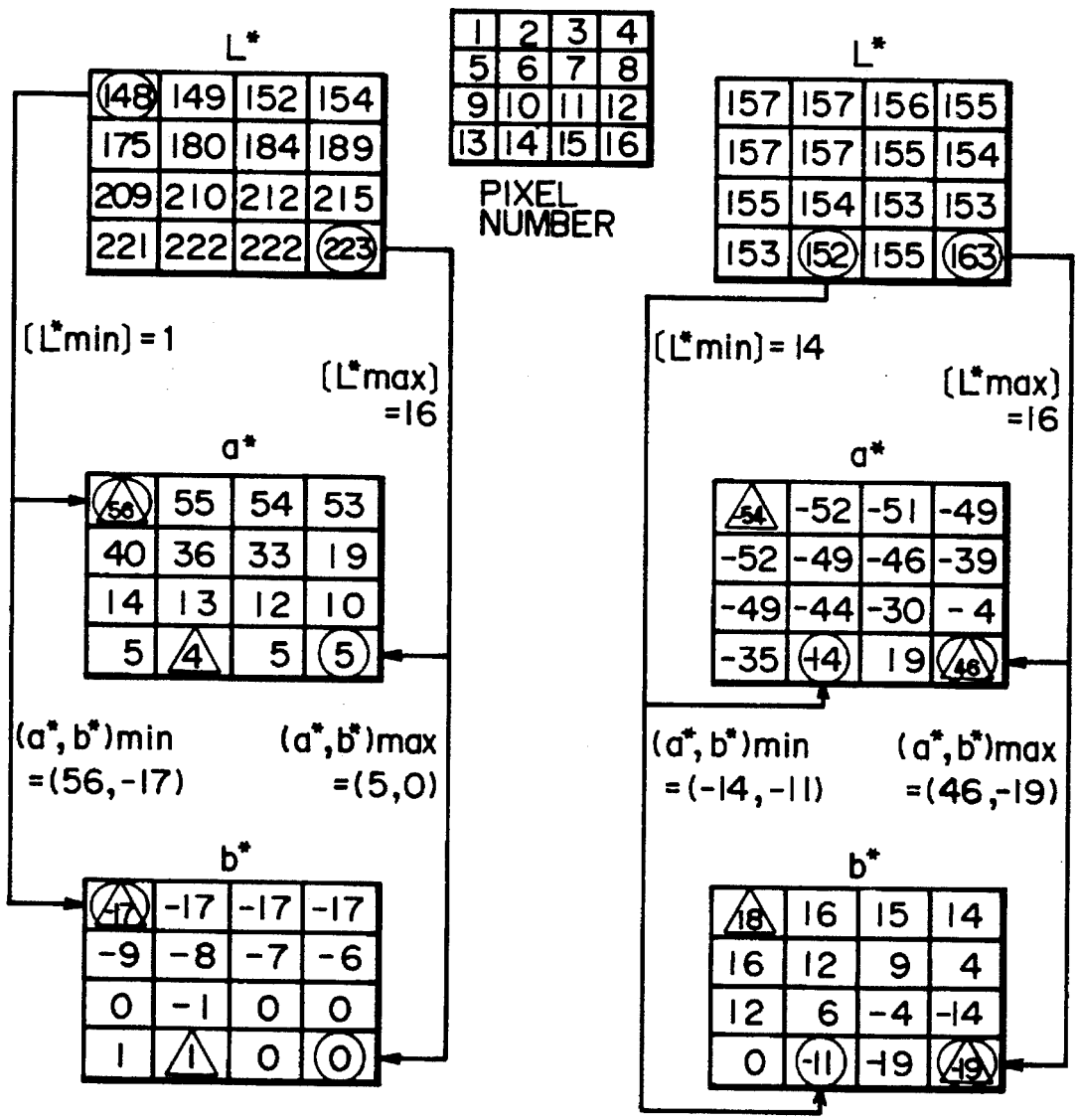
FIGS. 5A, 5B, and 5C are views for explaining the third embodiment.

FIGS. 5A to 5C are views for explaining the third embodiment in detail.

4×4 pixels constitute one block. FIG. 5A shows a block including a color character edge and having a strong correlation between lightness and chromaticity, and FIG. 5B shows one of the other color edge blocks. FIG. 5C shows pixel numbers in one block.

In FIG. 5A, pixel numbers yielding the maximum and minimum lightness values L* are respectively [L'max]=16 and [L*min]=1. Corresponding maximum and minimum chromaticity values are (a* b*)max=(5,0) and (a* b*)min=(56,−17). The color difference between these pixels is $\Delta de$=54. The maximum color difference in this block is $\Delta d$=55 between pixels #1 and #14 (indicated by a mark △). A difference $\Delta S=|\Delta de - \Delta d|=1$. Thus, it can be decided that a strong correlation is present.

In FIG. 5B, [L*max]=16 and [L*min*=14, and corresponding chromaticity values are (a* b*)max= (46,−19) and (a*,b*)min=(−14,−11), thus yielding a color difference $\Delta de$= 6]. The maximum color difference is $\Delta d$=107 between pixels #1 and #16, and $\Delta S=|\Delta de - \Delta d|=46$. Thus, it can be decided that the correlation between lightness and chromaticity is small.

FIG. 4 is a block diagram for realizing the third embodiment, and the circuit shown in FIG. 4 has a maximum color difference computing element 121, a maximum/minimum detector 151, a chromaticity extractor 152, a color difference computing element 153, an adder 154, comparators 122 and 155, and an AND gate 156.

The maximum color difference computing element 121 computes a maximum color difference $\Delta d$ in one block. The comparator 122 compares the difference $\Delta d$ with a threshold value $d_0$, thus obtaining a color edge decision signal E1. The maximum/minimum detector 151 obtains signals L*max and L*min indicating the pixels which respectively yield the maximum and minimum lightness values L*. The chromaticity extractor 152 obtains chromaticity values (a*,b*)max and (a*,b*)min of the pixels corresponding to L*max and L*min. The color difference computing element 53 computes a color difference $\Delta de$ between the maximum and minimum chromaticity values. The subtractor 154 calculates the difference $\Delta S$ between $\Delta de$ and $\Delta d$. The comparator 155 compares the difference $\Delta S$ with a given threshold value ST, thereby obtaining a correlation decision signal E2. The AND gate 156 ANDs the signals E1 and E2, and outputs a decision signal Ecode.

Figure 6:
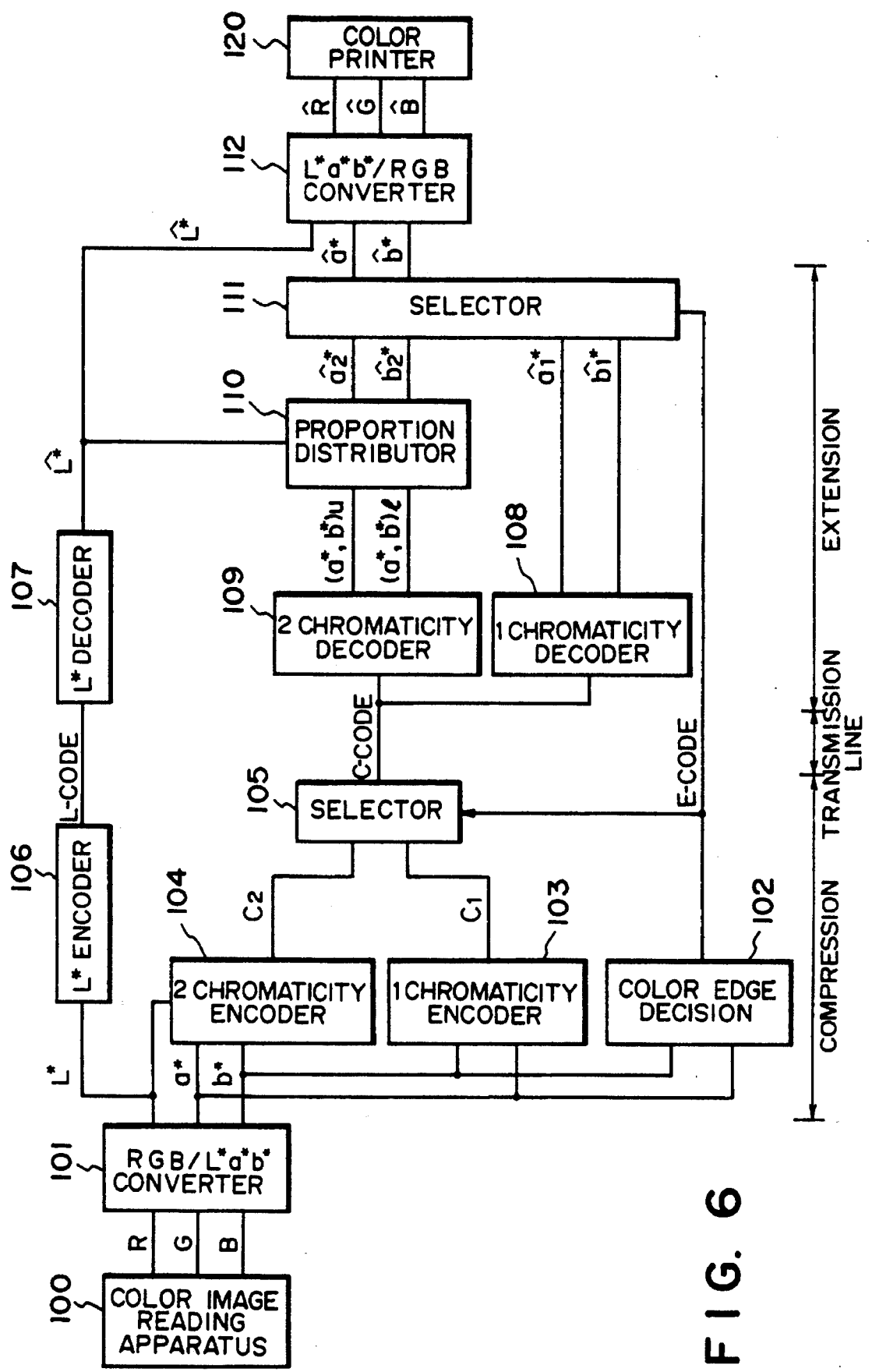

FIG. 6 is a block diagram showing a color image signal compression system to which the decision method of the third embodiment is to be applied.

Color image signals R, G, and B obtained by a color image reading apparatus 100 are converted to a uniform color space L*a*b* by a converter 101. Lightness data L* and chromaticity data (a*,b*) are separately encoded. A code having a given length is generated in units of blocks each consisting of a plurality of pixels.

When the chromaticity data (a*,b*) are encoded, either a color edge block encoding method or a flat block encoding method is selected for a given block, depending on whether or not a color edge (i.e., a change in chromaticity) is present in that block.

Any of the circuit shown in FIGS. 1, 2 and 4 may be adopted as color edge decision unit 102.

As shown in FIG. 7, color edge decision unit 102 comprises a maximum color difference computing element 121 for computing color differences between pixels and outputting a maximum value $\Delta d$, and a comparator 122 for comparing the maximum value $\Delta d$ with a given threshold value $d_0$.

The maximum color difference computing element 121 mainly comprises a microcomputer if the number of pixels constituting one block is large. When high-speed operation is required, element 121 can be constituted by a combination of a subtractor (adder), a comparator, and a selector. When the maximum value $\Delta d$ is larger than the threshold value $d_0$, it is decided that a color edge is present. When the threshold value $d_0$ is equal to or larger than the maximum value $\Delta d$, it is decided that color is flat in a chromaticity sense.

A 1-chromaticity encoder 103 for a flat-color block obtains one representative chromaticity value in a block, and outputs a color code C1 that value. For example, the encoder 103 calculates an average value of chromaticity values in the block, and uses the average value as the representative chromaticity.

A 2 chromaticity encoder 104 for a color edge obtains two representative chromaticity values in a block, and outputs a combination of the two values as a code C2. When two chromaticity values are extracted, chromaticity values corresponding to pixels yielding maximum and minimum lightness values are selected from pixels in the block. A selector 105 selects one of the color codes C1 and C2 in accordance with the color edge decision result Ecode of the block, and outputs the selected code as a final code Ccode. The lightness signal L* is encoded by an encoder 106 in units of blocks. The encoder 106 can utilize a technique proposed as a compression method for a monochromatic image, for example, a vector quantization technique, an orthogonal transformation technique using such as an Hadamard transformation, cosine transformation, or the like, or a combination of these techniques.

In this manner, the set of the lightness code Lcode, the chromaticity code Ccode, and the color edge decision code Ecode is used as a code for the corresponding block, and is subjected to necessary processing such as transmission, storage, and the like. Thereafter, the code is supplied to an expansion (extension) unit.

In this expansion unit, the code is decoded in units of lightness and chromaticity codes. An L* decoder 107 converts the lightness code Lcode into $\hat{L}$* in units of blocks. A 1 chromaticity (flat block) decoder 108 and a 2 chromaticity (color edge block) decoder 109 decode the color code Ccode. The 2 chromaticity decoder 109 decodes two representative chromaticity values $(\hat{a}*,\hat{b}*)l$ and $(\hat{a}*,\hat{b}*)u$ in a block. The two chromaticity values are used as those of pixels corresponding to the maximum and minimum lightness values $\hat{L}$* in a block. Thus, a chromaticity value $(a2*,b2*)$ of each pixel is obtained in proportion to the lightness $\hat{L}$* with reference to these two chromaticity values. The 1 chromaticity decoder 108 decodes $(\hat{a}1*,\hat{b}1*)$ as a representative chromaticity value of an entire block, which serves as the chromaticity of all the pixels in the block.

The appropriate one of these two types of chromaticity values is selected in accordance with the color edge code Ecode, thereby obtaining a final decoded chromaticity value $(\hat{a}*,\hat{b}*)$. The final chromaticity value and the lightness $\hat{L}$* are converted to $\hat{R}$, $\hat{G}$, and $\hat{B}$ signals by an L*a*b*/RGB converter 112, and these signals are output to, e.g., a color printer 120.

In the above embodiment, the technique shown in FIGS. 1 to 4 is applied to a compression/expansion system of a color image shown in FIG. 6. However, the present invention is not limited to this. For example, the present invention may be used in various other applications, e.g., color emphasis or color conversion processing for a color character.

As described above, according to this embodiment, in a color image processing apparatus for processing a color image signal in units of blocks each consisting of a plurality of pixels, an effect of preventing image degradation can be achieved.

What is claimed is:

1. A color image processing method comprising the steps of:
   a) providing color image data for a block comprising a plurality of pixels;
   b) separating said data into lightness data and chromaticity data for each pixel;
   c) discriminating a presence of an edge for each block by using the lightness data without reference to the chromaticity data;
   d) deciding whether or not the pixels in the block have a common hue by using the chromaticity data without reference to the lightness data; and
   e) judging whether or not the pixels in the block represent a part of a color line image on the basis of the edge discrimination and on the basis of the hue decision.

2. A method according to claim 1, wherein said deciding step further includes the step of deciding, when an edge is discriminated in the block, whether or not the pixels in the block have the common type of hue.

3. A method according to claim 1, wherein, in said discriminating step, it is discriminated that the pixels in the block have the common type of hue under a condition that the block is constituted by one chromatic color and an achromatic color.

4. A method according to claim 1, wherein in said discriminating step, it is discriminated whether or not a maximum color difference between pixels in the block falls in a predetermined range, to determine that the pixels in the block have the common type of hue.

5. A method according to claim 1, further comprising the step of photoelectrically converting an object color image to provide the color image data.

6. A method according to claim 1, further comprising the step of adaptively processing the color image data in accordance with a result obtained in said judging step.

7. A method according to claim 6, wherein said processing step includes compression processing the color image data.

8. A method according to claim 1, wherein the block is a 4 pixels×4 pixels block.

9. A color image processing method according to claim 1, wherein, in said discriminating step, the presence of an edge is discriminated for each block by using only the lightness data.

10. A color image processing method according to claim 1, wherein, in said deciding step, whether or not the pixels in the block have a common hue is decided based only on the chromaticity data.

11. A color image processing apparatus for processing color image data in units of blocks each comprising a plurality of pixels, said apparatus comprising:
   a) means for providing the color image data;
   b) means for separating the color image data into lightness data and chromaticity data for each pixel; and
   c) color line image judging means for judging whether a block includes a color line image, said color line image judging means comprising means for discriminating the presence of an edge in each block by using the lightness data without reference to the chromaticity data, and means for deciding whether or not the pixels in each block have common hue by using the chromaticity data without reference to the lightness data,
   wherein said color line image judging means judges whether each block contains a part of a color line image in accordance with the edge discrimination and the hue decision.

12. An apparatus according to claim 11, wherein when the block is constituted by one chromatic color and an achromatic color, said deciding means of said color line image decision means decides that the edge is a part of a color line image.

13. An apparatus according to claim 12, wherein, when chromaticity of each pixel in the block falls within a predetermined color phase range on a chromaticity plane, said color line image decision means decides that the block is constituted by one chromatic color and an achromatic color.

14. An apparatus according to claim 13, wherein pixels having chromaticity within a predetermined distance from an origin of the chromaticity plane are excluded from pixels used in determining whether the chromaticity of each pixels in the block falls within the predetermined color phase range on the chromaticity plane.

15. An apparatus according to claim 12, wherein, when a maximum value of color differences between pixels in the block is not larger than a predetermined value, said color line image decision means decides that the block is constituted by one chromatic color and an achromatic color.

16. An apparatus according to claim 11, wherein said color line image decision means uses a predetermined degree of correlation with a difference between a color difference between pixels yielding maximum and minimum values of the lightness data in the block, and a maximum value of color differences between pixels in the block as a value for deciding whether the edge is a part of a color hue image.

17. An apparatus according to claim 11, further comprising:

processing means for adaptively processing the color image data in accordance with the decision result of said color line image decision means.

18. An apparatus according to claim 17, wherein said processing means comprises means for compressing the color image data.

19. A color image processing apparatus according to claim 11, wherein said means for discriminating discriminates the presence of an edge of each block by using only the lightness data.

20. A color image processing apparatus according to claim 11, wherein said means for deciding decides whether or not the pixels in each block have a common hue by using only the chromaticity data.

* * * * *

UNITED STATES PATENT AND TRADEMARK OFFICE
CERTIFICATE OF CORRECTION

PATENT NO. : 5,488,670

DATED : January 30, 1996

INVENTOR(S) : Yoshiyuki Suzuki, et al.

Page 1 of 2

It is certified that error appears in the above-indentified patent and that said Letters Patent is hereby corrected as shown below:

COLUMN 2

Line 55, "10" should be deleted; and
Line 63, "color" (third occurrence) should read --"color"--.

COLUMN 3

Line 39, "10" should be deleted; and
Line 66, "$\theta |_{n1,m1} - \theta_{n2,m2}|$" should read --$|\theta_{n1,m1} - \theta_{n2,m2}|$,--.

COLUMN 4

Line 55, "decided." should read --identified--; and
Line 60, "decide" should read --identify--.

COLUMN 5

Line 13, "decided" should read --identified--; and
Line 60, "[L'max]" should read --[L*max]--.

COLUMN 6

Line 1, "[L*min*=14," should read --[L*min]=14,--;
Line 4, "6]." should read --61.--;
Line 11, "adder 154," should read --subtractor 154,--; and
Line 64, "that" should read --for that--.

UNITED STATES PATENT AND TRADEMARK OFFICE
CERTIFICATE OF CORRECTION

PATENT NO. : 5,488,670
DATED : January 30, 1996
INVENTOR(S) : Yoshiyuki Suzuki, et al.

It is certified that error appears in the above-indentified patent and that said Letters Patent is hereby corrected as shown below:

<u>COLUMN 7</u>

```
Line 1, "2 chromaticity" should read -- 2-chromaticity --;
Line 25, "1 chromaticity" should read -- 1-chromaticity --
and "2 chromaticity" should read -- 2-chromaticity --;
Line 27, "2 chromaticity" should read -- 2-chromaticity --;
and
Line 33, "1 chromaticity" should read -- 1-chromaticity --.
```

Signed and Sealed this

Eleventh Day of June, 1996

*Attest:*

BRUCE LEHMAN

*Attesting Officer*     *Commissioner of Patents and Trademarks*